United States Patent
Yuasa

(10) Patent No.: US 12,376,510 B2
(45) Date of Patent: Aug. 5, 2025

(54) AGRICULTURE GROUND WORK VEHICLE MONITORING SYSTEM

(71) Applicant: KUBOTA CORPORATION, Osaka (JP)

(72) Inventor: Junichi Yuasa, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 587 days.

(21) Appl. No.: 17/501,000

(22) Filed: Oct. 14, 2021

(65) Prior Publication Data

US 2022/0117144 A1 Apr. 21, 2022

(30) Foreign Application Priority Data

Oct. 15, 2020 (JP) .................................. 2020-173938

(51) Int. Cl.
| | | |
|---|---|---|
| *A01B 69/04* | (2006.01) | |
| *G05D 1/00* | (2006.01) | |
| *H04B 7/155* | (2006.01) | |
| *H04W 4/40* | (2018.01) | |
| *H04W 40/22* | (2009.01) | |
| *H04W 88/04* | (2009.01) | |

(52) U.S. Cl.
CPC ......... *A01B 69/008* (2013.01); *G05D 1/0022* (2013.01); *G05D 1/0044* (2013.01); *G05D 1/0278* (2013.01); *H04B 7/15507* (2013.01); *H04W 4/40* (2018.02); *H04W 40/22* (2013.01); *H04W 88/04* (2013.01)

(58) Field of Classification Search
CPC ...... A01B 69/008; H04W 4/40; H04W 40/22; G05D 1/0022; G05D 1/0044; G05D 1/0278; H04B 7/15507
See application file for complete search history.

(56) References Cited

U.S. PATENT DOCUMENTS

| | | | | |
|---|---|---|---|---|
| 5,613,205 A | * | 3/1997 | Dufour | ..................... G01S 5/14 455/440 |
| 7,647,908 B1 | * | 1/2010 | Biondo | .................. F02D 28/00 123/179.2 |
| 11,259,195 B1 | * | 2/2022 | Nevdahs | ............... H04W 40/22 |
| 2014/0129051 A1 | * | 5/2014 | Gautama | ................ H04W 4/40 701/2 |

(Continued)

FOREIGN PATENT DOCUMENTS

| | | | |
|---|---|---|---|
| JP | 08-84375 A | | 3/1996 |
| JP | 2018-132326 A | | 8/2018 |
| JP | 2018163514 A | * | 10/2018 |

OTHER PUBLICATIONS

Translation of JP2018163514A (Year: 2018).*

*Primary Examiner* — Kenneth J Malkowski
(74) *Attorney, Agent, or Firm* — Keating & Bennett, LLP

(57) ABSTRACT

A work vehicle includes a satellite positioning apparatus, a monitoring camera, a vehicle wireless communicator and an automated travel controller. A monitoring terminal includes an operation interface to be operated by a monitoring person, a monitor capable of displaying a shot image of the monitoring camera and a terminal wireless communicator. A relay apparatus is configured or programmed to relay data communication between the vehicle wireless communicator and the terminal wireless communicator.

5 Claims, 8 Drawing Sheets

(56) References Cited

U.S. PATENT DOCUMENTS

| | | | |
|---|---|---|---|
| 2015/0112469 A1* | 4/2015 | Da Silva Neto | H04W 4/021 700/108 |
| 2015/0304361 A1* | 10/2015 | Tamura | H04L 65/1069 370/262 |
| 2019/0369260 A1 | 12/2019 | Ishikawa et al. | |

* cited by examiner

AGRICULTURE GROUND WORK VEHICLE MONITORING SYSTEM

CROSS REFERENCE TO RELATED APPLICATIONS

This application claims the benefit of priority to Japanese Patent Application No. 2020-173938 filed on Oct. 15, 2020. The entire contents of this application are hereby incorporated herein by reference.

BACKGROUND OF THE INVENTION

1. Field of the Invention

The present invention relates to a work vehicle monitoring system.

2. Description of the Related Art

In the case of monitoring a travel state using information sent from a work vehicle by wireless data communication, the wireless communication state between the work vehicle and a monitoring terminal is important. In wireless usage for general purposes, wireless coverage is legislatively restricted. Thus, when the distance between the work vehicle and the monitoring terminal gets longer, the wireless communication state deteriorates and information from the work vehicle is lost. In order to avoid this, a monitoring person with a monitoring terminal needs to follow the work vehicle, but this places a significant burden on the monitoring person in the case where the work area is expansive. In a surrounding situation capture system according to JP2018-132326A, a remote operating signal for operating an unmanned travel vehicle from a manned operating point with an operation interface and a surrounding situation signal for notifying the surrounding situation of the unmanned travel vehicle to the operation interface are transmitted via a first relay apparatus disposed on a middle of a path for a signal transmission between the manned operating point and the monitoring point. The surrounding situation signal is generated by a surrounding situation capture device mounted in the unmanned travel vehicle. The unmanned travel vehicle is loaded with second relay apparatuses, and when the distance between the first relay apparatus and the unmanned travel vehicle gets longer and the wireless communication state between the first relay apparatus and the unmanned travel vehicle deteriorates, one of the second relay apparatuses is disposed in that position. By linking a plurality of relay apparatuses together, wireless communication is kept possible between the operation interface and the unmanned travel vehicle that has to travel a long distance away. In the surrounding situation capture system according to JP2018-132326A, favorable wireless communication between a manned operating point and an unmanned travel vehicle is established by disposing relay apparatuses therebetween, in the case where the unmanned travel vehicle is linearly distanced from the manned operating point. However, with work by a work vehicle in a typical work area, the work area extends in a polygonal shape in the case of agricultural work by a tractor or the like in a field, for example. In work on a work area having such a shape, there is a problem in that unnecessary relay apparatuses whose coverage overlaps with other relay apparatuses increase by disposing relay apparatuses sequentially. With a remote control apparatus for an unmanned construction equipment according to JPH08-84375A, images captured by a monitoring camera mounted in the unmanned construction equipment are wirelessly transmitted to a manned operation interface. The monitoring person operates the manned operation interface while viewing these images. The unmanned construction equipment is remotely controlled by operating signals transmitted wirelessly from the manned operation interface. At this time, an unmanned relay vehicle having a transmitter and a receiver that relay operating signals and image signals is disposed between the manned operation interface and the unmanned construction equipment. Operating signals and image signals can be transmitted wirelessly even between the manned operation interface and the unmanned construction equipment that are far apart from each other, by a plurality of unmanned relay vehicles being sequentially disposed serially between the manned operation interface and the unmanned construction equipment, that is, by a plurality of unmanned relay vehicles being linked together. In the remote-control apparatus according to JPH08-84375A, the relay apparatus itself is able to move freely as an unmanned relay vehicle, and thus the relay apparatus can be used with versatility. However, further investing in unmanned relay vehicles in order to wirelessly operate the unmanned construction equipment not only leads to an increase in investment costs but also increases the burden for the work monitoring person in term of wirelessly operating both the unmanned construction equipment and the plurality of unmanned relay vehicles. Furthermore, neither JP2018-132326A nor JPH08-84375A take into consideration the fact that the wireless operation interface itself moves. In fact, some monitoring person intends to follow the unmanned travel vehicle for keeping the unmanned travel vehicle in his/her view, with carrying the wireless operation interface. In this case, the distance between the wireless operation interface, the relay apparatus and the unmanned travel vehicle will change, and, as a result, the problem arises of the wireless communication state therebetween being variable.

SUMMARY OF THE INVENTION

Preferred embodiments of the present invention are capable of maintaining a favorable wireless communication state between an automated travel work vehicle and a monitoring person that performs wireless operations, even when a position of a monitoring person changes.

A work vehicle monitoring system according to a preferred embodiment of the present invention includes a work vehicle capable of automated travel including a satellite positioning apparatus, a monitoring camera, a vehicle wireless communicator, and an automated travel controller; a monitoring terminal including an operation interface to be operated by a monitoring person, a monitor capable of displaying a shot image of the monitoring camera, and a terminal wireless communicator; and a relay apparatus configured or programmed to relay data communication between the vehicle wireless communicator and the terminal wireless communicator, wherein the monitoring terminal is configured or programmed to notify a first communication status indicating a wireless communication status between the terminal wireless communicator and the vehicle wireless communicator, a second communication status indicating a wireless communication status between the terminal wireless communicator and the relay apparatus, and a third communication status indicating a wireless communication status between the relay apparatus and the vehicle wireless communicator, and acquire the third communication status through the data communication.

With this configuration, the monitoring person is able to always keep track of the wireless communication status (wireless communication state) between the monitoring terminal and the work vehicle, the wireless communication status between the monitoring terminal and the relay apparatus, and the wireless communication status between the relay apparatus and the work vehicle, through the monitoring terminal. Wireless communicators communicating wirelessly with each other are capable of detecting the wireless communication status from the other communicator, but are not capable of detecting the wireless communication status between other communicators communicating wirelessly with each other. In this preferred embodiment, the wireless communication status between the relay apparatus and the work vehicle can be kept track of on the monitoring terminal side through data communication. Consequently, even in the case where deterioration of the wireless communication status between the relay apparatus and the work vehicle results in poor wireless communication between the monitoring terminal and the work vehicle, the monitoring person can grasp the situation immediately. As a result, the monitoring person can rectify the positional relationship between the monitoring terminal, the relay apparatus and the work vehicle immediately, in order to recover such poor wireless communication. Note that the wireless communication status referred to here includes various factors that adversely affect wireless communication from the positional relationship between wireless communicators, examples of which include wireless reception sensitivity, wireless communication speed, and wireless communication quality.

In order to quickly and intelligibly notify the wireless communication statuses between the monitoring terminal, the relay apparatus and the work vehicle with the monitoring terminal, it is suitable to display the respective communication statuses on a monitor. Thus, in one preferred embodiment of the present invention, the monitoring terminal is configured or programmed to display the first communication status, the second communication status and the third communication status on the monitor.

The relay apparatus becomes an obstacle to the travel of the work vehicle when disposed in the work area in order to effectively utilize the relay apparatus. Thus, in order to avoid damage to the relay apparatus due to coming in contact with the work vehicle, the relay apparatus is preferably moved to change the installation location at least once. Thus, in one preferred embodiment of the present invention, the relay apparatus is a movable device capable of changing position during work of the work vehicle.

Naturally, the relay apparatus may be provided with a travel function or a flying function.

In order to rectify poor wireless communication caused by deterioration of the wireless communication status, it is necessary to be aware of the exact positional relationship between the monitoring terminal (monitoring person), the relay apparatus and the work vehicle. However, in the case where the work area is expansive, it is difficult for the monitoring person to visually check the exact positional relationship of the relay apparatus and the work vehicle, and the like. Thus, in one preferred embodiment of the present invention, the monitoring terminal is configured or programmed to record a terminal position indicating a current position of the monitoring terminal, a vehicle position indicating a current position of the work vehicle, and an installation position of the relay apparatus, and display the terminal position, the vehicle position and the installation position on a map screen of the monitor.

The monitoring person is able to rectify poor wireless communication by viewing the map screen and being aware of the exact positional relationship between the monitoring terminal, the relay apparatus and the work vehicle.

When the terminal position, vehicle position and installation position are known, calculating the inter-distance between the monitoring terminal, the relay apparatus and the work vehicle is possible. In the case where the communication status is dependent on the inter-distance (separation distance), shortening an inter-distance that has become too long is a measure for recovering a communication status that has deteriorated. Given this situation, in one preferred embodiment of the present invention, the monitoring terminal is configured or programmed to calculate a recovery measure for communication status recovery, in a case where at least one of the first communication status, the second communication status and the third communication status decreases to less than or equal to a predetermined level.

For example, in the case where the recovery measure involves shortening an inter-distance that has been long, appropriately changing the position of the monitoring terminal or the relay apparatus enables the inter-distance to be shortened and favorable wireless communication to be maintained, before the wireless connection is disconnected.

In the case of estimating deterioration of the communication status from the change in the inter-distances between the monitoring terminal, the relay apparatus and the work vehicle, the travel direction of the work vehicle is preferably taken into consideration. Whether the communication status will further deteriorate from now on is dependent on travel behavior including the current position of the work vehicle, the travel track indicating the area already worked, and the travel route that will subsequently be traveled. Given this situation, in one preferred embodiment of the present invention, the monitoring terminal is configured or programmed to calculate the recovery measure, based on travel behavior of the work vehicle, the installation position of the relay apparatus, and the current position of the monitoring terminal.

Because shot images from the monitoring camera mounted to the work vehicle are displayed on the monitor of the monitoring terminal, the monitoring person is able to monitor the travel state including the situation around the work vehicle by the shot images. In the case where a problem such as an anomaly with the work vehicle or the presence of a travel obstacle is found, in order to remove the problem, the monitoring person is advantageously able to remotely control the work vehicle (control the vehicle to stop, turn, etc.) through the monitoring terminal. Given this situation, in one preferred embodiment of the present invention, an operating instruction provided via the operation interface, to control the automated travel controller is wirelessly transmitted from the terminal wireless communicator to the vehicle wireless communicator.

In automated travel of the work vehicle, a satellite positioning apparatus is used to calculate the vehicle position, with a satellite positioning system called RTK-GPS preferably being used for high-precision position measurement. In the RTK-GPS system, the satellite positioning apparatus mounted in the work vehicle receives correction data from a base station installed on the ground, with the wireless communication or the like. When a wireless communication function receiving the correction data of this RTK-GPS system is incorporated into the work vehicle monitoring system according to a preferred embodiment of the present invention, the reliability of the vehicle position calculation is advantageously increased. Given this situation, in one preferred embodiment of the present invention, the work vehicle monitoring system further includes a base station that provides correction data generated based on radio waves from a satellite to the satellite positioning apparatus, wherein the vehicle wireless communicator is configured or programmed to receive the correction data from the base station directly or from the base station via the relay apparatus.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
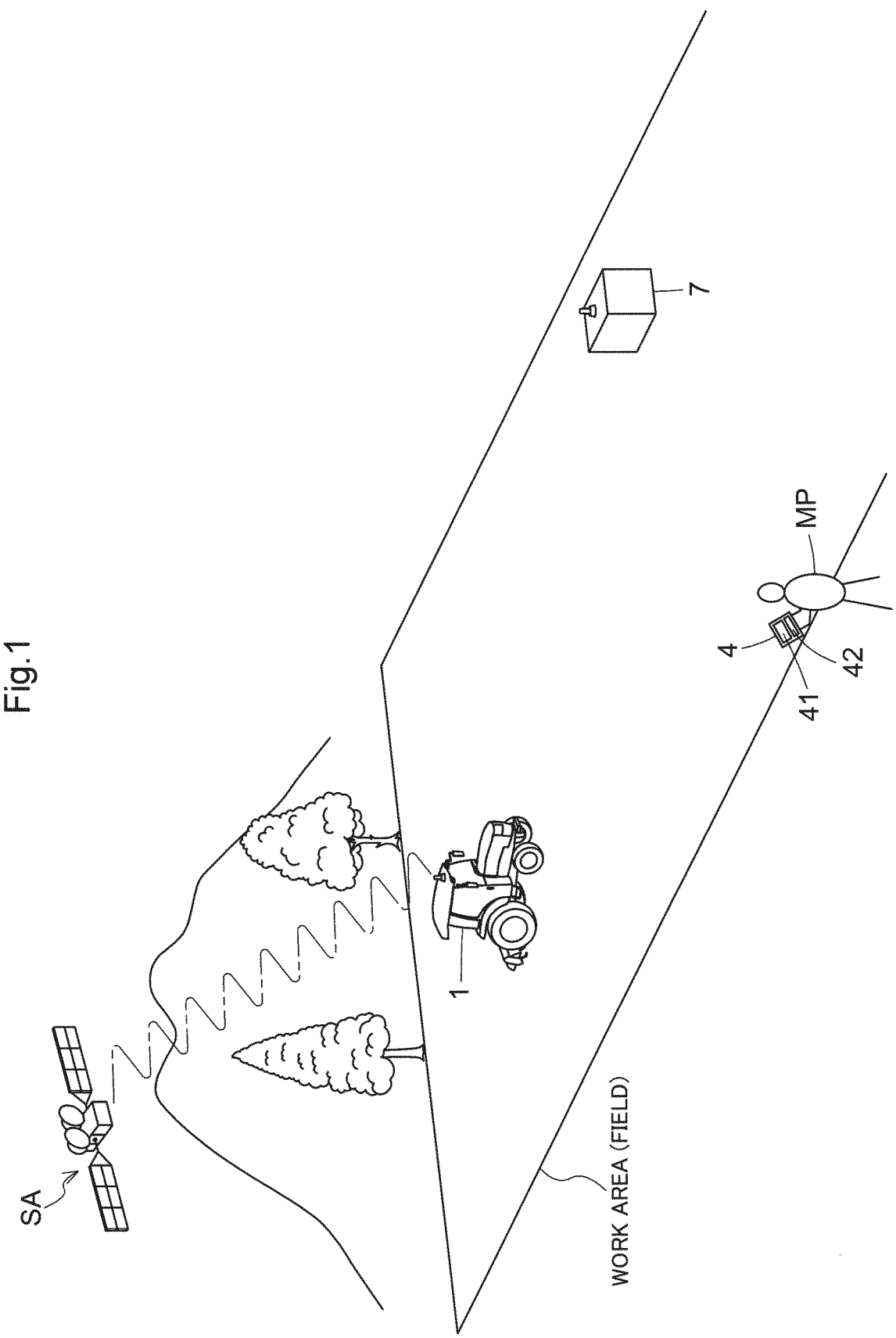
FIG. 1 is a schematic diagram showing an outline of a work vehicle monitoring system.

Work vehicle monitoring systems according to preferred embodiments of the present invention will be described with the drawings. FIG. 1 shows a tractor 1 (example of work vehicle) that travels automatically around a field (example of work area) with a satellite navigation system while receiving radio waves including satellite positioning information from a satellite SA. The status (travel status and work status) of the tractor 1 that travels automatically is monitored by a monitoring person (shown by reference sign MP in FIG. 1) who is carrying a monitoring terminal 4. The monitoring terminal 4 is a PC (personal computer) device provided with a wireless (Wi-Fi) function, a monitor function (image display function), and a terminal position detection function that uses GNSS (global navigation satellite system) or the like. Thus, a CPU, a RAM and a storage medium (hard disk, flash memory, SSD, etc.) are provided in the monitoring terminal 4.

Figure 2:
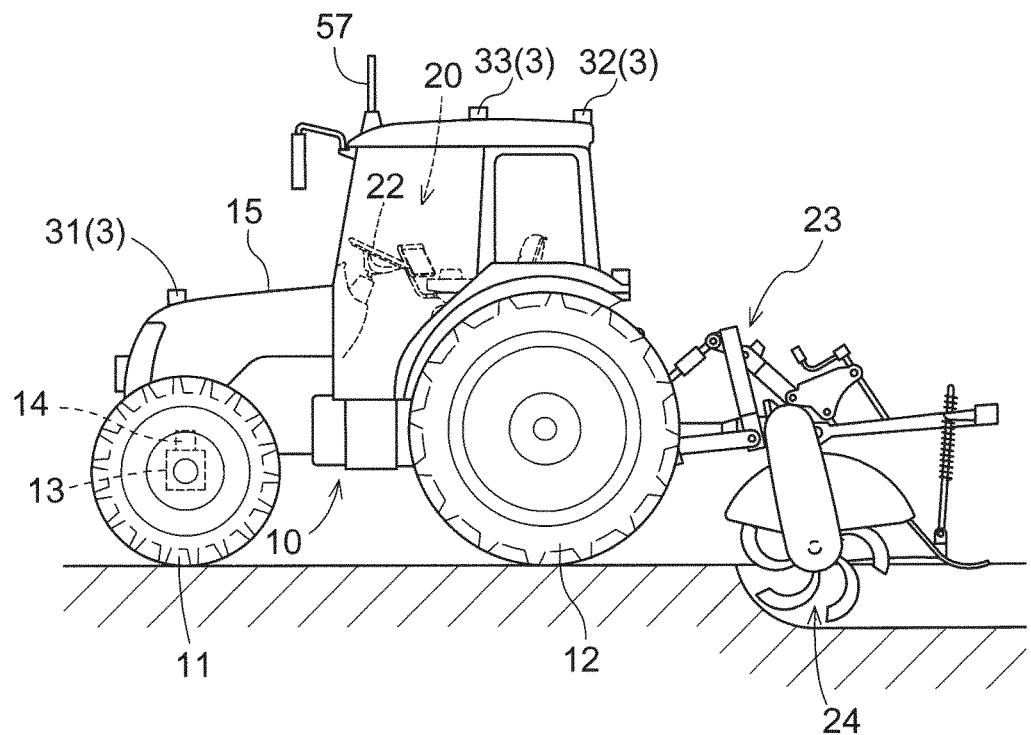
FIG. 2 is a side view of a tractor which is an example of a work vehicle capable of automated travel.

As shown in FIG. 2, the tractor 1 is provided with a driving portion 20 in a central portion of a vehicle body 10 supported by front wheels 11 and rear wheels 12. A rear portion of the vehicle body 10 is equipped with a work device 24 which is a rotary tilling device via a hydraulic lifting mechanism 23. The front wheels 11 are steerable, and the travel direction of the tractor 1 is changed by changing the steering angle of the front wheels 11. The steering angle of the front wheels 11 is changed by operation of a steering mechanism 13. The steering mechanism 13 includes a steering motor 14. In the case of manual travel, the front wheels 11 is steered by operation of a steering wheel 22 that is disposed in the driving portion 20.

Figure 3:
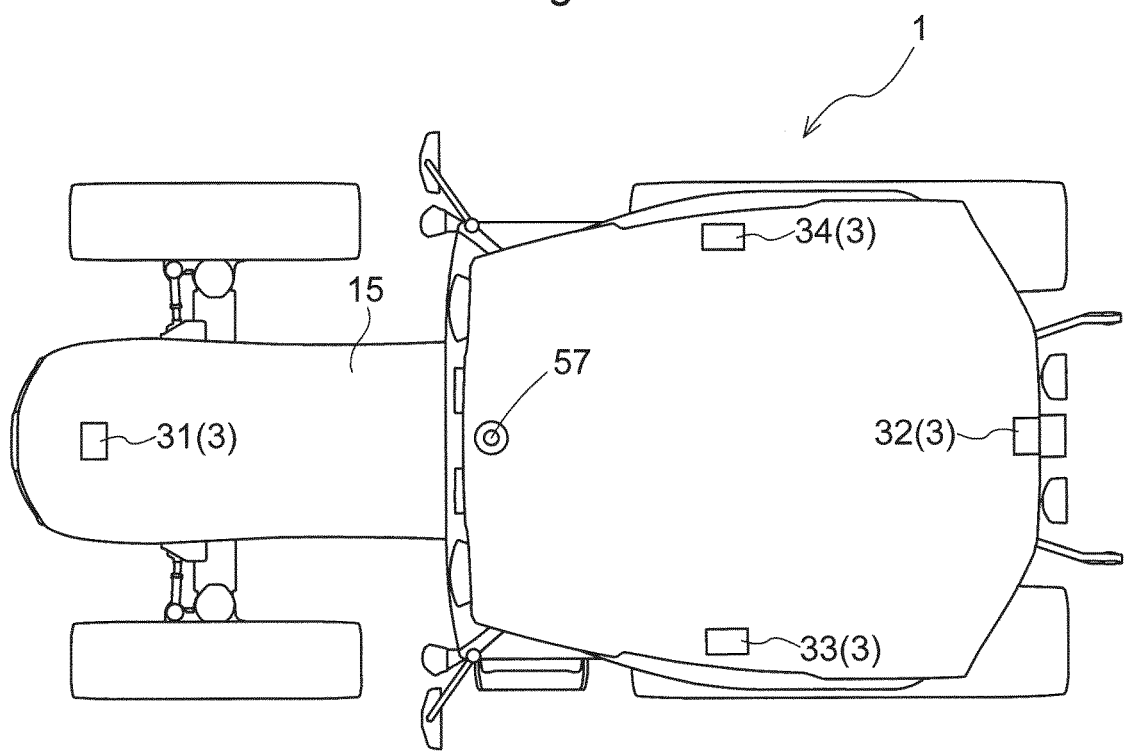
FIG. 3 is a schematic plan view of the tractor for describing the attachment position of monitoring cameras.

The tractor 1 is provided with a plurality of monitoring cameras 3 that shoot images of the field (example of work area) including a peripheral region of the vehicle body 10 and outputs the images as monitoring images. In the present preferred embodiment, as shown in FIG. 3, the monitoring cameras 3 includes a front monitoring camera 31, a rear monitoring camera 32, a left monitoring camera 33, and a right monitoring camera 34. The front monitoring camera 31 is disposed on a front portion of a bonnet 15 and shoots forward of the vehicle body 10. The rear monitoring camera 32 is disposed on a rear portion of a cabin covering the driving portion 20 and shoots rearward of the vehicle body 10 including the work device 24. The left monitoring camera 33 and the right monitoring camera 34 are respectively disposed on a side portion of the cabin and shoot leftward and rightward of the vehicle body 10. By compositing shot images from the monitoring cameras 31, 32, 33, 34 through viewpoint conversion, it is possible to generate an overhead image whose viewpoint is upward of the tractor 1. Accordingly, the monitoring images described below are assumed to include a forwardly shot image, a rearwardly shot image, laterally shot images, and an overhead image.

The tractor 1 is provided with a satellite positioning apparatus 57 which is a GNSS receiver for calculating the vehicle position required during automated travel. A satellite antenna for receiving GNSS signals (including GPS signals) is attached to a ceiling region of the cabin as an element of the satellite positioning apparatus 57. Note that, in order to supplement satellite navigation, it is possible for an inertial navigation module incorporating a gyroscope acceleration sensor, a magnetic direction sensor and the like to be combined with the satellite positioning apparatus 57. The inertial navigation module may be provided in a different location to the satellite positioning apparatus 57.

Monitoring images shot by the monitoring camera(s) 3 of the tractor 1 are sent to the monitoring terminal 4 by wireless communication to be displayed on a touch panel monitor 41 (example of monitor) of the monitoring terminal 4. The monitoring person is thereby able to keep track of the travel status, work status and the like of the tractor 1 when far away. In the present preferred embodiment, the monitoring terminal 4 is provided with an operation interface 42 that is operated by the monitoring person in the form of software buttons or hardware buttons. A vehicle stop button, an engine stop button, a work stop button and the like may be allocated to the operation interface 42.

A distance of the wireless communication that is used outdoors is limited, and, for example, the wireless communication status deteriorates when the distance between the tractor 1 and the monitoring terminal 4 exceeds 100 meters, and stable communication may no longer be possible. In that case, a relay apparatus 7 is installed in the field, as shown in FIG. 1. The relay apparatus 7 is movable in different locations as needed, and it is possible to install a plurality of relay apparatuses 7. Deterioration of the wireless communication status is avoided when a monitoring person follows the tractor 1 with carrying the monitoring terminal 4. But the relay apparatus 7 is needed in an expansive field because of constraints on the movement of the monitoring person who has various work to do concurrently.

Figure 4:
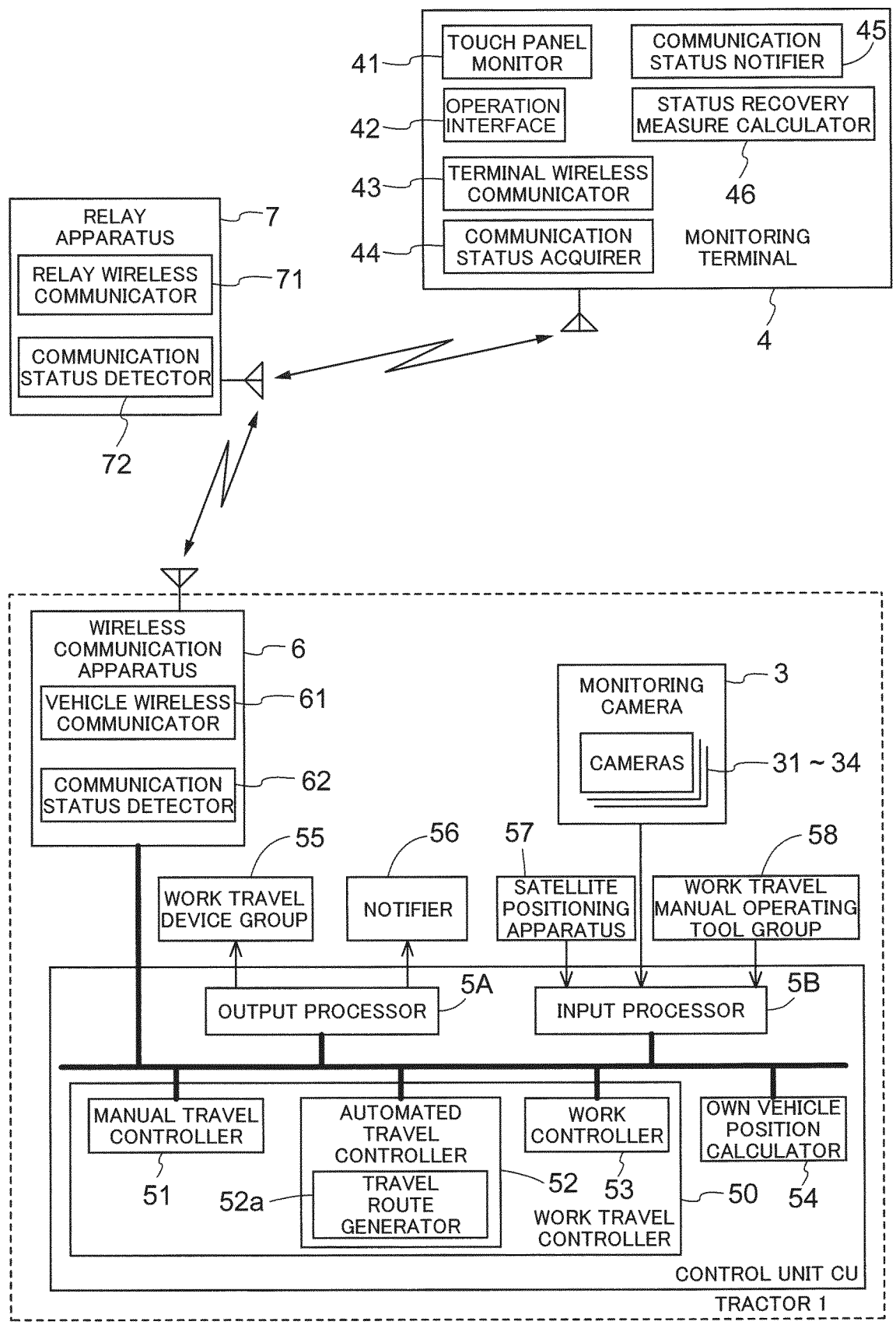
FIG. 4 is a functional block diagram showing functional units in the work vehicle monitoring system.

FIG. 4 is a functional block diagram showing functions of the tractor 1, the monitoring terminal 4 and the relay apparatus 7 that relate to preferred embodiments of the present invention. A control unit CU is constituted by an ECU which is a computer for use in control, and is an element of the control system of the tractor 1. Thus, the control unit CU is provided with a CPU, a RAM, and a storage medium (flash memory, EEPROM, etc.).

The control unit CU is provided with an output processor 5A and an input processor 5B as an input-output interface. The tractor 1 is provided with a wireless communication apparatus 6 in order to communicate wirelessly with wireless communicators outside the vehicle, and the wireless communication apparatus 6 is connected to the control unit CU. The output processor 5A is connected to a work travel device group 55 including various operation devices for work travel such as the steering motor 14, and to a notifier 56 such as a meter or a stack light, for example. The input processor 5B is connected to a satellite positioning apparatus 57, to a work travel manual operating tool group 58 that is used when performing work travel of the tractor 1 manually, and to the monitoring camera(s) 3, for example.

A vehicle wireless communicator 61 of the wireless communication apparatus 6 performs data communication wirelessly with a terminal wireless communicator 43 of the monitoring terminal 4 via a relay wireless communicator 71 of the relay apparatus 7, or performs data communication wirelessly with the terminal wireless communicator 43 directly. The wireless communication apparatus 6 is provided with a communication status detector 62 that detects the wireless communication status in the vehicle wireless communicator 61. The relay apparatus 7 is provided with a communication status detector 72 that detects the wireless communication status in the relay wireless communicator 71.

A work travel controller 50 and an own vehicle position calculator 54 are included in the control unit CU of the tractor 1, the work travel controller 50 including an ECU which is a computer for use in control. The own vehicle position calculator 54 calculates its own vehicle position (vehicle position) which is a coordinate position (map coordinates or field coordinates) of the tractor 1, based on positioning data sent sequentially from the satellite positioning apparatus 57.

A manual travel controller 51, an automated travel controller 52, and a work controller 53 are included in the work travel controller 50. The manual travel controller 51 functions when a manual travel mode is set. The manual travel controller 51 controls the work travel device group 55 based on instructions generated by the driver's operation of the work travel manual operation tool group 58.

A travel route generator 52a is included in the automated travel controller 52. The travel route generator 52a reads out outer shape data of the field from input field information, and generates and sets a travel route in the field. The driver can modify the generated travel route. The travel route generator 52a is capable of downloading and setting a travel route generated by another computer. In either case, the travel route set by the travel route generator 52a is used as a target route for automated travel. Even in manual travel, the travel route set by the travel route generator 52a may be utilized for guidance in order for the tractor 1 to travel along the travel route. The automated travel controller 52 functions in the case where an automated travel mode is set. The automated travel controller 52 gives control instructions to the work travel device group 55 that is required for automated travel. For example, the automated travel controller controls the steering motor 14, by calculating direction difference and position difference between the set travel route and the own vehicle position calculated by the own vehicle position calculator 54, and generating automated steering instructions for eliminating the direction difference and position difference.

Monitoring images shot by the monitoring camera(s) 3 are transmitted from the tractor 1 to the monitoring terminal 4 being carried by the monitoring person, via the wireless communication apparatus 6. The received monitoring images are displayed on the touch panel monitor 41. The monitoring terminal 4 is provided with a communication status acquirer 44, a communication status notifier 45, and a status recovery measure calculator 46, in addition to the terminal wireless communicator 43. The communication status acquirer 44, the communication status notifier 45, and the status recovery measure calculator 46 function for wireless communication, respectively.

Note that in the following description of the present preferred embodiment, reception sensitivities indicating strength of received wireless signals are taken as the wireless communication status. The communication status acquirer 44 functions as a reception sensitivity acquirer. The communication status notifier 45 functions as a reception sensitivity notifier. The communication status detector 62 functions as a sensitivity recovery measure calculator. The communication status detector 72 function as a reception sensitivity detector. Naturally, the reception sensitivities may be replaced by all the factors or one of the factors that cause deterioration of the wireless communication status, such as wireless communication speed and wireless communication quality. In this case, the communication status acquirer 44, the communication status notifier 45, the communication status detector 62, and the communication status detector 72 may be configured to process with all of the factors or one of the factors that cause deterioration of the wireless communication status, such as wireless communication speed and wireless communication quality, as the processing target. Similarly, the status recovery measure calculator 46 functions as a sensitivity recovery measure calculator, but may also be configured to process with all or one of these other factors as the processing target.

The communication status acquirer 44 is capable of acquiring a first reception sensitivity (one type of first communication status), a second reception sensitivity (one type of second communication status), and a third reception sensitivity (one type of third communication status) as three wireless communication statuses. The first reception sensitivity is the wireless communication status between the terminal wireless communicator 43 and the vehicle wireless communicator 61. The second reception sensitivity is the wireless communication status between the terminal wireless communicator 43 and the relay wireless communicator 71. The third reception sensitivity is the wireless communication status between the relay wireless communicator 71 and the vehicle wireless communicator 61. Wireless communication between the relay wireless communicator 71 and the vehicle wireless communicator 61 is unrelated to the terminal wireless communicator 43. The wireless communication apparatus 6 or the relay apparatus 7 transmits the third reception sensitivity detected by the communication status detector 62 or the communication status detector 72 to the terminal wireless communicator 43 of the monitoring terminal 4. The third reception sensitivity received by the terminal wireless communicator 43 is provided to the communication status acquirer 44.

The communication status acquirer 44 acquires the first reception sensitivity, the second reception sensitivity and the third reception sensitivity. The communication status notifier 45 graphically displays the first reception sensitivity, the second reception sensitivity and the third reception sensitivity on the touch panel monitor 41. In other words, the monitoring terminal is configured or programmed to display the first reception sensitivity, second reception sensitivity and third reception sensitivity on the touch panel monitor 41.

Furthermore, the monitoring terminal 4 may be configured or programmed to notify the first reception sensitivity, second reception sensitivity or third reception sensitivity that has decreased to less than or equal to a predetermined level to the monitoring person by message display or by lamp or buzzer. In the case where any of the above factors apart from reception sensitivity is taken as the wireless communication status, an appropriate graphic display, message display or the like is performed, according to the factor.

The status recovery measure calculator 46 is configured or programmed to calculate the recovery measure for reception sensitivity recovery, in the case where at least one of the first reception sensitivity, second reception sensitivity and third reception sensitivity decreases to less than or equal to the predetermined level. To recover a reception sensitivity that has decreased due to the wireless communication distance increasing, the communication distance needs to be shortened. Changing the work travel of the tractor 1 leads to work delays, deterioration of work quality and the like, and thus the monitoring terminal 4 or the relay apparatus 7 is moved. In order to ensure a favorable wireless communication state between the monitoring terminal 4, the relay apparatus 7 and the tractor 1, the status recovery measure calculator 46 calculates which of the monitoring terminal 4 and the relay apparatus 7 to move and in what manner to move.

Here, data transmission with wireless communication between the monitoring terminal 4, the relay apparatus 7 and the tractor 1 will be described using FIG. 5.

In the case where the communication distance between the monitoring terminal 4 and the tractor 1 is short and a favorable communication state is ensured, the terminal wireless communicator and the vehicle wireless communicator 61 communicate data directly without the relay apparatus 7. Monitoring data including the monitoring images of the monitoring camera(s) 3 is sent from the tractor 1 to the monitoring terminal 4 by data communication, and the monitoring person can check the monitoring data through the touch panel monitor 41. The monitoring data may include not only monitoring images but also the travel work state of the tractor 1, such as the remaining fuel amount, vehicle speed, and the state value of the work device 24, for example. The third reception sensitivity indicating the communication state between the relay apparatus 7 and the tractor 1 is also transmitted from the terminal wireless communicator 43 to the vehicle wireless communicator 61. Furthermore, in the present preferred embodiment, it is possible to remotely control the tractor 1, by generating operating instructions using the operation interface 42 of the monitoring terminal 4 and wirelessly transmitting the operating instructions (control signals) from the terminal wireless communicator 43 to the vehicle wireless communicator 61. In an emergency, the monitoring person thereby can stop the tractor 1 when far away.

The relay apparatus 7 is used in the case where the communication distance of the monitoring terminal 4 and the tractor 1 gets longer and reception sensitivities decrease (communication state becomes unstable). Some monitoring person intends to move irregularly along the furrows with carrying the monitoring terminal 4. Also, the tractor 1 repeatedly travels back and forth so as to cover unworked area(s) of the field. Thus, the relay apparatus 7 is installed in an appropriate position, with consideration for the movements of the monitoring terminal 4 and the tractor 1. The terminal wireless communicator 43 and the vehicle wireless communicator 61 are thereby capable of communicating data in a stable communication state, via the relay wireless communicator 71. The monitoring data from the tractor 1 is sent to the monitoring terminal 4 via the relay apparatus 7.

In the present preferred embodiment, the own vehicle position of the tractor 1 and the installation position of the relay apparatus 7 are sent to the monitoring terminal 4, and thus the monitoring terminal 4 records and manages the positions of the tractor 1 and the relay apparatus 7. Note that the installation position of the relay apparatus 7 is calculated by a device position calculation function (GPS function, etc.) of the relay apparatus 7. In the case where the relay apparatus 7 does not have a GPS function, a position is acquired when the monitoring person installs the relay apparatus 7 with carrying the monitoring terminal 4, by a terminal position calculation function (GPS function, etc.) provided in the monitoring terminal 4.

Figure 5:
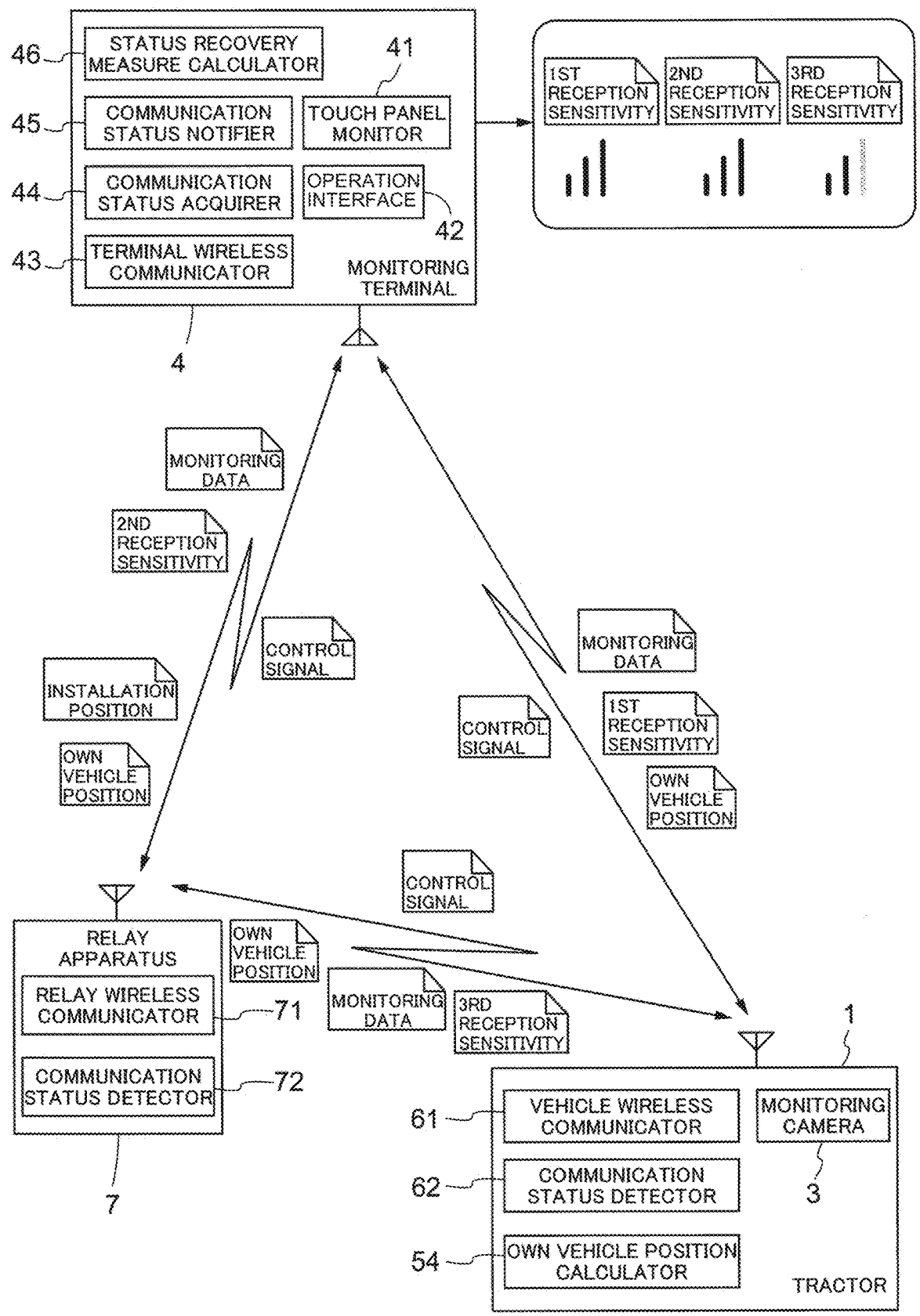
FIG. 5 is a dataflow diagram showing the flow of data in the work vehicle monitoring system.
Figure 6:
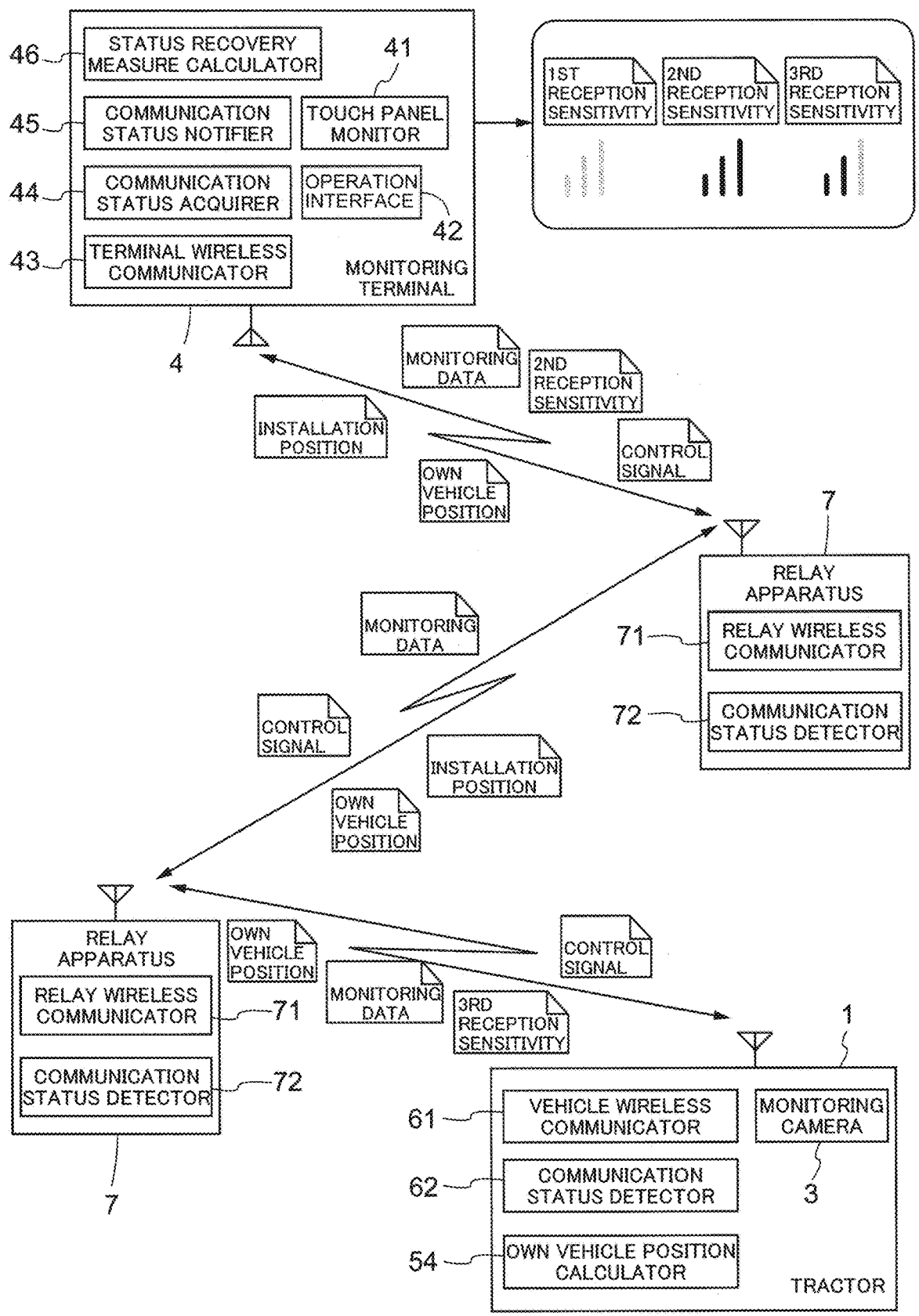
FIG. 6 is a dataflow diagram showing the flow of data in a work vehicle monitoring system including a plurality of the relay apparatuses.

In the example shown in FIG. 5, one relay apparatus 7 is used, but a plurality of relay apparatuses 7 may be used. FIG. 6 shows an example in which two relay apparatuses 7 are used. In the case where a decrease in reception sensitivity occurs on any of the communication routes between the monitoring terminal 4, the tractor 1 and the relay apparatus 7, an additional relay apparatus 7 is installed on the communication route on which the decrease in reception sensitivity occurred. Alternatively, an installed relay apparatus 7 is transferred (repositioned) to a suitable position. Thus, the relay apparatus 7 is installed in the field with an anchor that is capable of being freely removed and inserted in the field. The monitoring person can carry the relay apparatus 7 to reposition it. In the case where the field is expansive, the relay apparatus 7 may be provided with a self-traveling function or a flying function (flying by drone).

Figure 7:
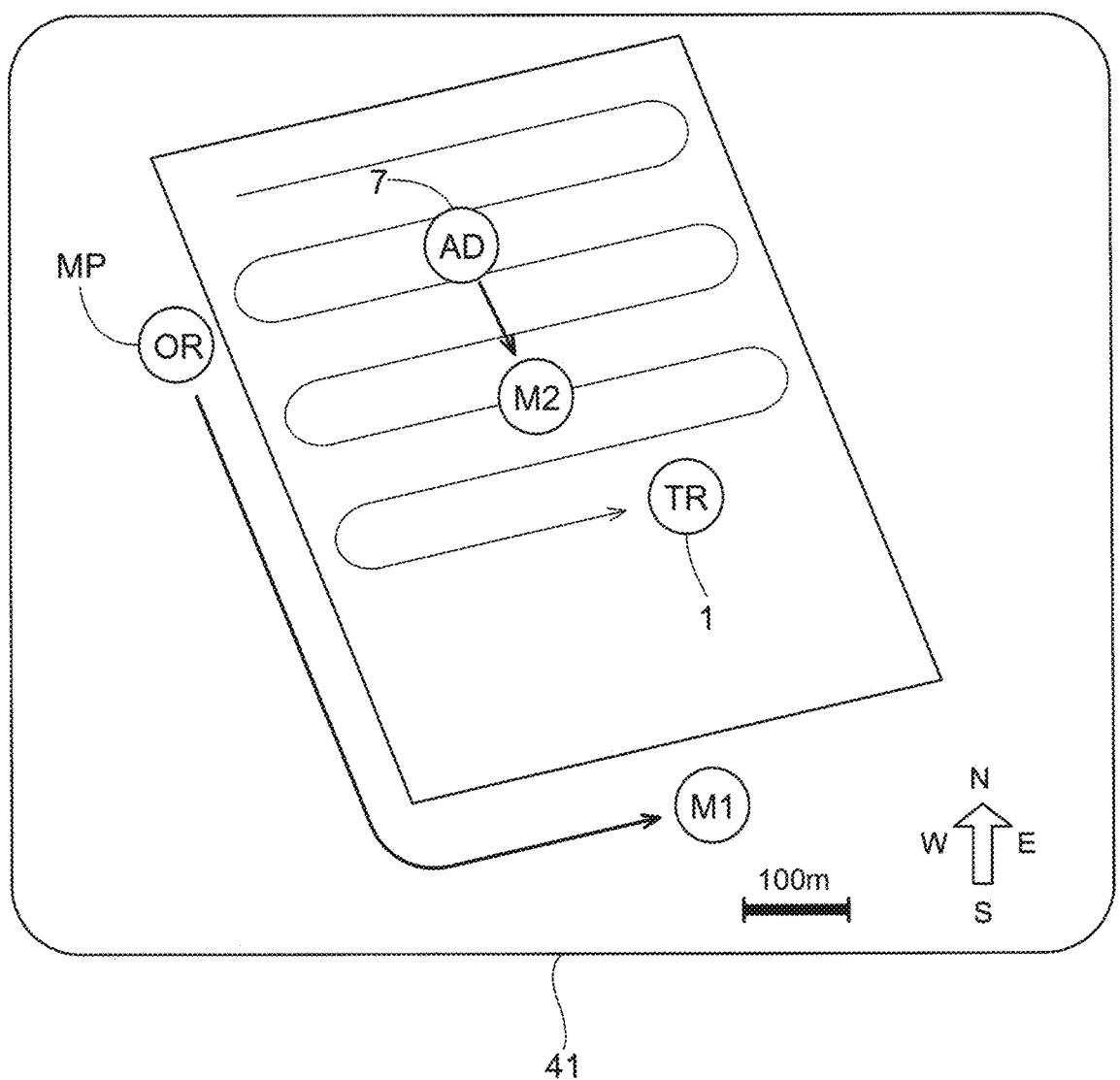
FIG. 7 is a monitoring screen diagram showing the positions of the tractor, the relay apparatus and the monitoring terminal.

The own vehicle position of the tractor 1 and the installation position of the relay apparatus 7 that are managed by the monitoring terminal 4. The own vehicle position and the installation position are notified to the monitoring person together with the position of the monitoring terminal 4. For example, as shown in FIG. 7, the touch panel monitor 41 of the monitoring terminal 4 is capable of displaying these respective positions in an overlaid manner on a map screen of the field. In FIG. 7, a symbol with the reference sign TR displays the tractor 1, a symbol with the reference sign OR displays the monitoring terminal 4, and a symbol with the reference sign AD displays the relay apparatus 7. The monitoring person is thereby able to keep track of the positional relationship between the monitoring terminal 4, the tractor 1 and the relay apparatus 7. In other words, the monitoring terminal 4 is configured or programmed to display the position of the monitoring terminal 4, the vehicle position, and the installation position of the relay apparatus 7 on a map screen of the touch panel monitor 41.

In the case where a decrease in reception sensitivity exceeding a warning level occurs on one of the communication routes between the monitoring terminal 4, the tractor 1 and the relay apparatus 7, the line indicating the communication route concerned changes to a warning color such as red, as a warning that the reception sensitivity has decreased. Also, in the case where one of the distances between the monitoring terminal 4, the tractor 1 and the relay apparatus 7 exceeds a warning distance that causes deterioration of reception sensitivity, the line indicating the communication route concerned changes to a warning color such as red, as a warning that the reception sensitivity has decreased.

In the case where the field is expansive, the monitoring person may also allow the tractor 1 to continue traveling, while keeping track of the positions of the monitoring terminal 4, the tractor 1 and the relay apparatus 7 on the touch panel monitor 41, even when a warning of a decrease in reception sensitivity (communication instability) due to an increase in communication distance or the like is notified. At this time, the monitoring person will be undecided as to the recovery measure for avoiding a decrease in reception sensitivity. This recovery measure is a solution to the problem of the manner in which to move one of the monitoring terminal 4 and the relay apparatus 7, based on the current positions of the monitoring terminal 4, the tractor 1 and the relay apparatus 7. Various algorithms for calculating the positional relationship between a fixed body and a moving body may be used in solving such a problem. Such an algorithm is incorporated in the status recovery measure calculator 46. The status recovery measure calculator 46 is configured or programmed to calculate the recovery measure, based on travel behavior including the current position of the tractor 1, as well as the installation position of the relay apparatus 7 and the current position of the monitoring terminal 4. The travel behavior further includes the travel track indicating the area already worked and the travel route that will subsequently be traveled. The optimal position to which to move the monitoring terminal 4 or the relay apparatus 7 is derived by simulating inter-distances, with consideration of the fact that the tractor 1 will travel through unworked area(s) along the work route. The recovery measure of the status recovery measure calculator 46 is displayed on the touch panel monitor 41 of the monitoring terminal 4 as an illustration in an overlaid manner on a map screen of the field, as shown in FIG. 7, for example. This example shows the monitoring terminal 4 moving to a recommended movement destination (shown by reference numeral M1 in FIG. 7) as a first sensitivity recovery measure, and the relay apparatus 7 moving to a recommended movement destination (shown by reference numeral M2 in FIG. 7) as a second sensitivity recovery measure.

Figure 8:
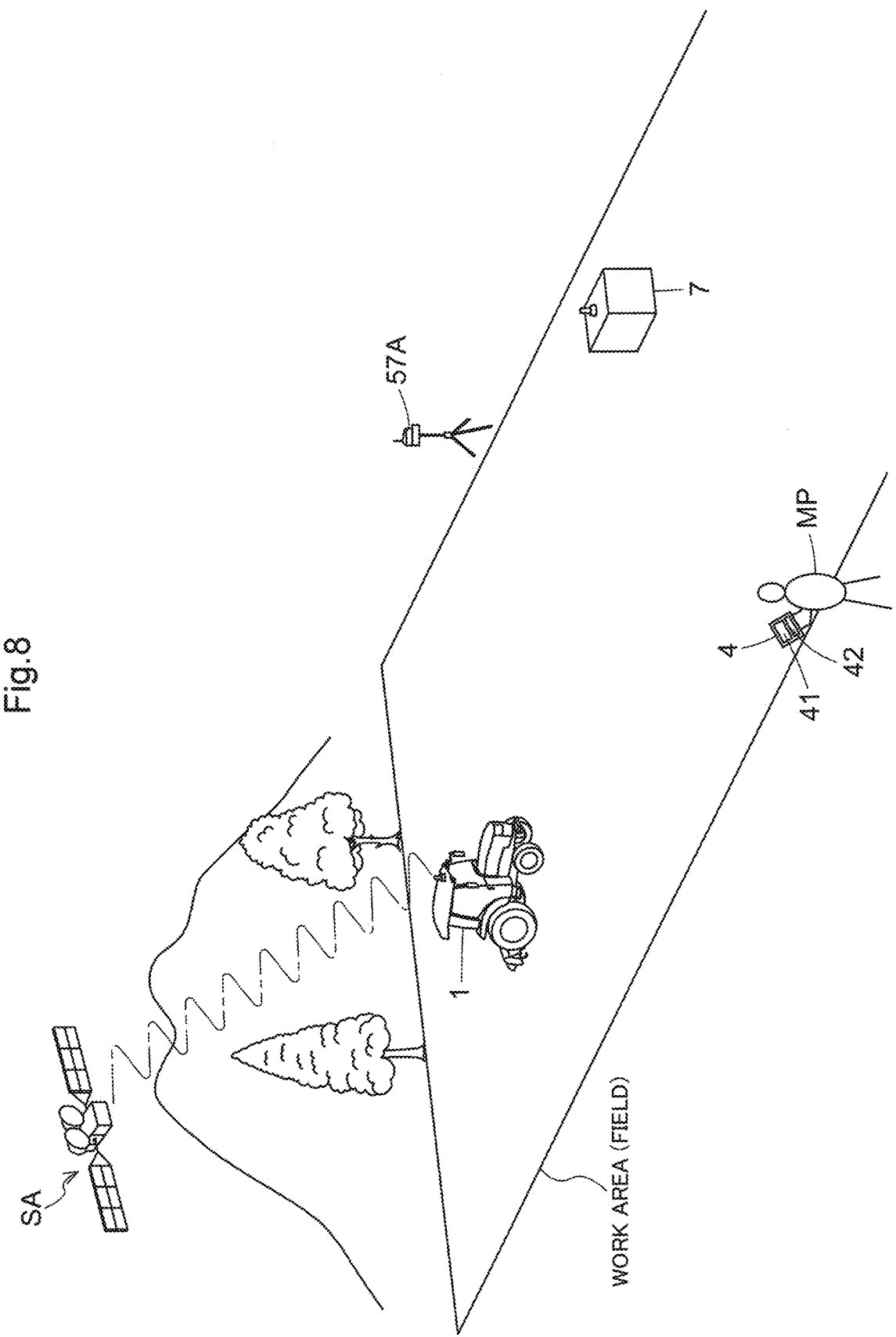
FIG. 8 is a schematic diagram showing an outline of a work vehicle monitoring system.

FIG. 8 shows an outline of a work vehicle monitoring system in which real-time kinematic GPS (hereinafter, abbreviated as RTK-GPS) is used to improve the positioning accuracy of the satellite positioning apparatus 57. A detailed description will be omitted here since RTK-GPS is well known. A base station 57A is installed near the field for the operation of a positioning system with RTK-GPS. The base station 57A calculates correction data, using an RTK-GPS correction algorithm. The calculated correction data is provided to the satellite positioning apparatus of the tractor 1. The satellite positioning apparatus 57 generates more exact positioning data using the received correction data and radio waves from the satellite SA, and provides the generated positioning data to the own vehicle position calculator 54.

Figure 9:
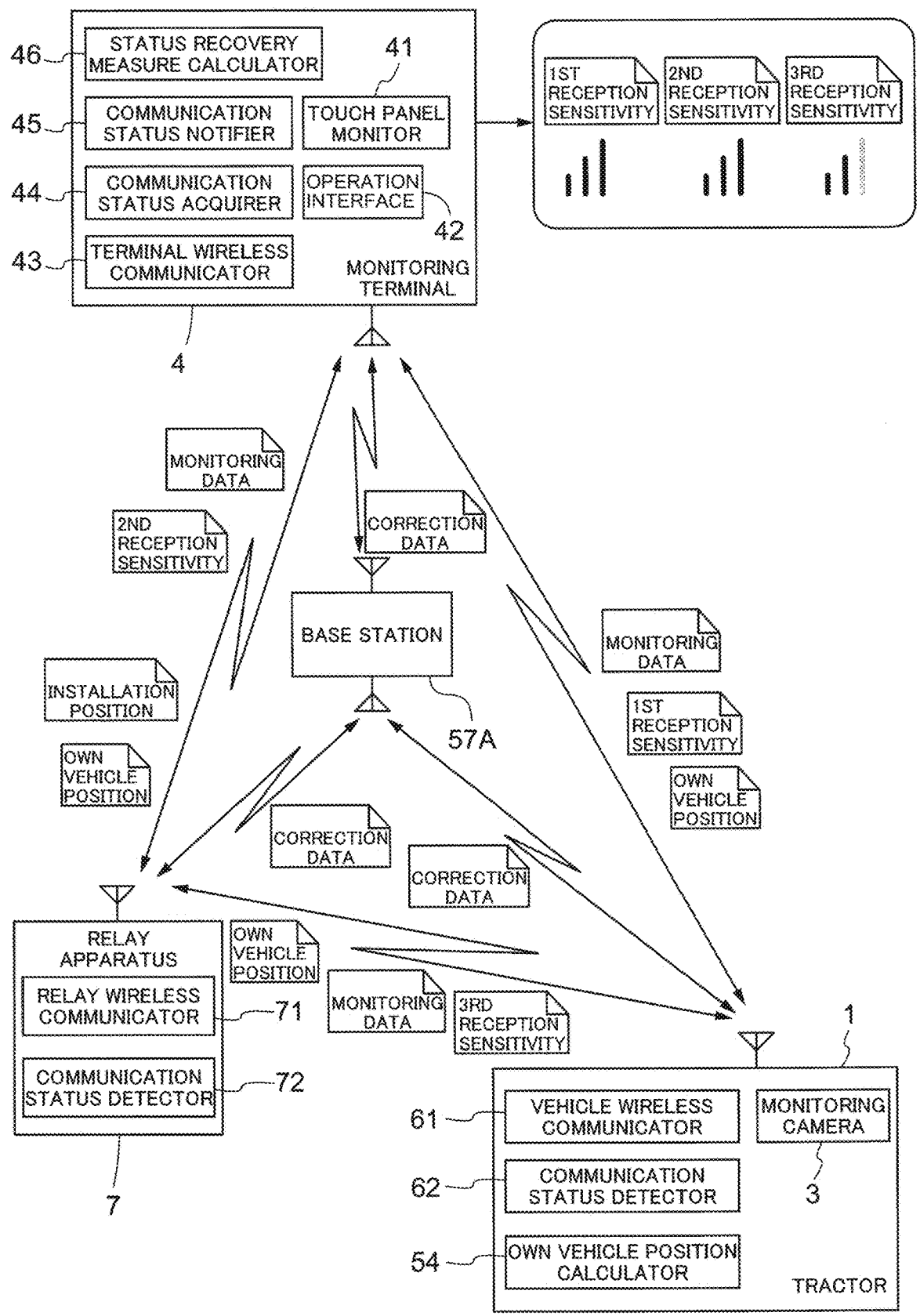
FIG. 9 is a dataflow diagram showing the flow of data in the work vehicle monitoring system.

FIG. 9 is a dataflow diagram of the work vehicle monitoring system shown in FIG. 8. Here, the correction data calculated by the base station 57A may be transmitted wirelessly from the base station 57A to the tractor 1 by the following two selectable communication routes.

(1) Correction data is transmitted from the base station 57A to the vehicle wireless communicator 61 of the tractor 1 directly or via the relay apparatus 7.

(2) Correction data is transmitted from the base station 57A to the monitoring terminal 4, and is transmitted from the monitoring terminal 4 to the vehicle wireless communicator 61 of the tractor 1 directly or via the relay apparatus 7.

Additional Preferred Embodiments

The present invention is not limited to the configurations illustrated in the above preferred embodiment, and other representative preferred embodiments of the present invention will be illustrated below.

(1) In the abovementioned preferred embodiment, there is only one tractor 1 defining as the work vehicle, but there may be a plurality of tractors 1. In this case, a control program for the plurality of tractors 1 to travel automatically in a coordinated manner is implemented in the work vehicle monitoring system. The monitoring person can follow the tractors 1 using monitoring information including monitoring images from the tractors 1 suitably selected to be displayed on the touch panel monitor 41. In the case where the touch panel monitor 41 has a large screen size, plural pieces of monitoring information may be displayed on the touch panel monitor 41 simultaneously. Furthermore, in the case where RTK-GPS is used, correction data may be managed by the monitoring terminal 4, and the monitoring terminal 4 may transmit the correction data to the plurality of tractors 1 on a timely basis.

(2) The functional units in FIGS. 4 to 6 and FIG. 9 are mainly separated for the purpose of description. In actuality, the functional units may be integrated with other functional units, or may be further separated into a plurality of functional units.

Preferred embodiments of the present invention are applicable to a monitoring system for work vehicles capable of automated travel, including agricultural machinery such as tractors and combine harvesters, construction machinery such as backhoes and dozers (bulldozers), and conveying machinery such as transport vehicles.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An agricultural ground work vehicle monitoring system comprising:
   a work vehicle capable of automated travel, including:
      a satellite positioning apparatus;
      a monitoring camera;
      a vehicle wireless communicator to perform Wi-Fi communication, the vehicle wireless communicator including an antenna; and
      an automated travel controller;
   a monitoring terminal including:
      an operation interface to be operated by a monitoring person;
      a monitor capable of displaying a shot image of the monitoring camera; and
      a terminal wireless communicator to perform Wi-Fi communication, the terminal wireless communicator including an antenna; and
   a relay apparatus configured or programmed to relay Wi-Fi data communication between the vehicle wireless communicator and the terminal wireless communicator,
   the relay apparatus being movable to different locations on a field and including an antenna; wherein
   the monitoring terminal is configured or programmed to:
      control the monitor to indicate a first reception sensitivity indicating a strength of wireless signals between the terminal wireless communicator and the vehicle wireless communicator, a second reception sensitivity indicating a strength of wireless signals between the terminal wireless communicator and the relay apparatus, and a third reception sensitivity indicating a strength of wireless signals between the relay apparatus and the vehicle wireless communicator;

acquire the third reception sensitivity through the data communication from at least one of the vehicle wireless communicator and the relay apparatus; and calculate a recovery measure for sensitivity recovery in response to detection of at least one of the first reception sensitivity, the second reception sensitivity, and the third reception sensitivity decreasing to less than or equal to a predetermined level.

2. The agricultural ground work vehicle monitoring system according to claim 1, wherein the relay apparatus is a movable device capable of changing position during work of the work vehicle.

3. The agricultural ground work vehicle monitoring system according to claim 1, wherein the monitoring terminal is configured or programmed to:

record a terminal position indicating a current position of the monitoring terminal, a vehicle position indicating a current position of the work vehicle, and an installation position of the relay apparatus; and display the terminal position, the vehicle position and the installation position on a map screen of the monitor.

4. The agricultural ground work vehicle monitoring system according to claim 1, wherein an operating instruction provided via the operation interface to control the automated travel controller is wirelessly transmitted from the terminal wireless communicator to the vehicle wireless communicator.

5. The agricultural ground work vehicle monitoring system according to claim 1, further comprising:

a base station to provide correction data generated based on radio waves from a satellite to the satellite positioning apparatus; wherein the vehicle wireless communicator is configured or programmed to receive the correction data from the base station directly or from the base station via the relay apparatus.

\* \* \* \* \*